Sept. 25, 1962
D. O. KIPPENHAN
3,055,631
ELECTROSTRICTION VALVE
Filed Nov. 25, 1960
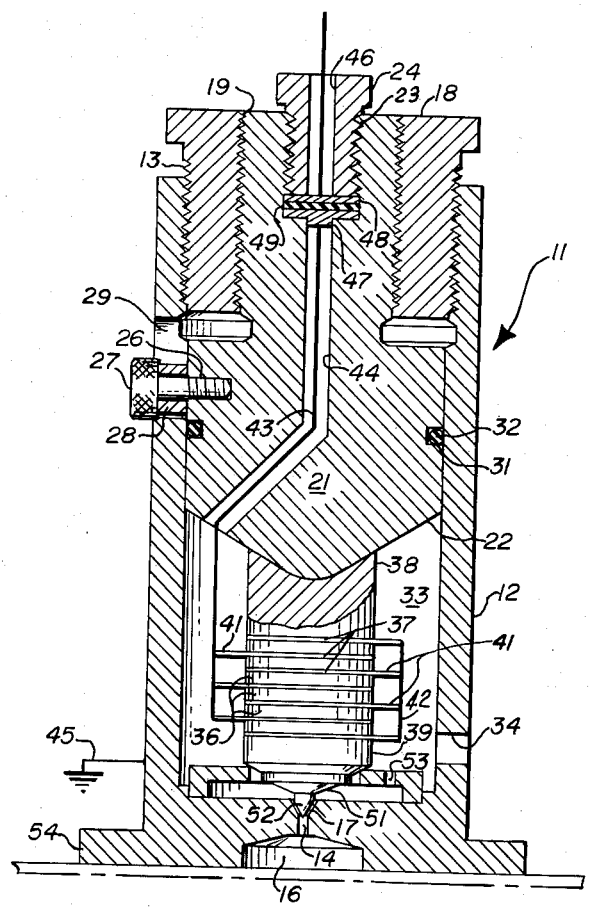
INVENTOR.
DEAN O. KIPPENHAN
BY
ATTORNEY > United States Patent Office 3,055,631
Patented Sept. 25, 1962

3,055,631
ELECTROSTRICTION VALVE
Dean O. Kippenhan, Castro Valley, Calif., assignor to the United States of America as represented by the United States Atomic Energy Commission
Filed Nov. 25, 1960, Ser. No. 71,848
5 Claims. (Cl. 251—129)

The present invention relates to a valve of the pulse type and more particularly to an accurately controlled pulse valve employing electrostrictive means in its operation.

There are countless numbers of valves in industry and science which are employed in countless and varied applications and exhibit many techniques of operation. In general, the greater portion of such valves are used to interrupt or extend some type of fluid flow, the main requirements thereof being size, capacity, durability, etc. However, in the field of scientific research valves generally must meet further requirements of minute capacities in highly controlled pulse sequences, high speed operation, synchronized operation with related electronic components, variable valve operating time durations during and between output pulses, etc. Therefore, valves employed in the scientific field contain substantial refinements over valves in general.

More particularly, in the study of plasma behavior there is great need for a valve capable of introducing small and exacting quantities of deuterium gas, for example, in exact and controllably timed sequences. Previous valves have, for the most part, been cumbersome in that they have neither supplied a proper amount of gas nor been able to do so in properly timed sequences and pulse variations. Furthermore, since such studies of plasma behavior are usually conducted in an atmosphere inhabited by intense magnetic fields there is need for a valve capable of operating under the foregoing conditions and which in turn, will contribute a minimum of disturbance to the fields. A still further shortcoming in most prior art valves is that of being incapable of operating at high temperatures or of being "baked" for applicability in high vacuum systems.

The present invention overcomes the difficulties of previous mention and provides a valve whereby gases, including deuterium gas, may be supplied wherever desired in either semi-continuous flow or in pulses. The operation of the valve is variable and can be controlled electrically to provide the exact amount of gas desired in the necessary time period and sequence. Moreover, the valve of the present invention is readily "bakeable" and operable at high temperatures and exerts a negligible influence on magnetic fields which may exist in its environment.

It is therefore an object of the present invention to provide a valve with improved and more flexible controls than heretofore attainable with previous valves for scientific research.

It is another object of the present invention to provide a valve controlled by electrostrictive means.

A further object of the present invention is to provide a valve which may be precisely controlled to deliver an exact output in a predetermined pulse sequence or time duration.

A still further object of the present invention is to provide a valve capable of operating in intense magnetic fields with a minimum of disturbance thereof.

It is yet another object of the present invention to provide a precisely controlled valve capable of being baked for use in high vacuum systems.

Further objects and advantages of the present invention will become apparent by referring to the following specification and claims taken in conjunction with the accompanying drawing of which the single figure is a cross sectional view of a preferred embodiment of the present invention.

Referring now to the drawing there is shown an electrostrictive valve 11 comprising a hollow, cylindrical body 12 closed at its lower end to form an enclosure therein and provided with internal threads along a portion of its upper or open end. An orifice 14 extends axially through the center of the closed end of the body 12 and into the enclosure to provide communication from inside the body to an outer cavity 16 formed in the under surface of the closed end thereof. The orifice 14 is beveled at its upper end to form a seat 17, where said seat 17 is preferably constructed of metal.

Attached within the open end of body 12 and disposed to travel axially therein by means of the threads is a centrally apertured adjusting nut 18. The nut 18 is provided with an axial threaded bore 19, the threads of the bore being of finer thread-size than the external threads 13. A cylindrical stem 21 is attached to nut 18 by means of the threaded bore 19, and due to the difference of internal and external thread sizes, turning of the adjusting nut 18 imparts a relatively slight axial movement to stem 21, thus the nut 18 is utilized as a fine axial adjustment of the position of the stem.

The lower portion of stem 21 is slidably fitted within the body 12 to travel axially therein. The lower end of stem 21 is shaped in a convex surface 22 and the upper end thereof is axially tapped to provide internal screw threads 23 which receive a seal nut 24. The lower portion of stem 21 is also radially tapped at 26 to mount a radially extending guide screw 27 and spacer 28 which are arranged to slide along a longitudinal slot 29 cut into a length of body 12. Stem 21 further has a circumferential groove 31 disposed about its lower end and which serves as a means of mounting a rubber O-ring 32 to provide a high vacuum seal between stem 21 and body 12, thus forming a sealed volume or enclosure 33 within the lower portion of body 12. In applications of the valve 11 where high temperatures may be a necessary operating parameter or when it is desired that the valve be bakeable for use in high vacuum systems it is necessary to form the O-ring 32 of a material other than rubber, for example, Teflon. A port 34 extending radially through the wall of body 12 provides entrance to the enclosure 33.

Considering now in detail the preferred structure of the electrostriction means of the valve 11 which serves to control the flow therethrough, it is noted that such comprises in general a columnar stack of discs 36 formed of a material which exhibits an electrostrictive effect, preferably lead zirconate, mounted alternately with thin copper discs 37, the columnar stack depending centrally from the lower end surface 22 of stem 21. To provide structural strength the lead zirconate discs 36 and copper discs 37 are secured in such an alternate order, one to the other, by means of a conductive glue or adhesive. Such a glue may be, for example, composed of 10% epoxy resin impregnated with 90% silver. A circular metal top plate 38 and a circular metal bottom plate 39 are rigidly secured to the top and bottom respectively of the stacked column of lead zirconate and copper discs preferably by the same silver impregnated epoxy glue of previous mention. The top plate 38 is hollowed to mate with the convex surface 22 of stem 21, thus providing a means for aligning and securing the stacked column to body 12. A connecting tab 41 extends from each of the copper discs 37 to provide electrical connection thereto. The tabs associated with alternate copper discs are mounted 180° of arc from each other to thereby appear on opposite sides of the column. The tabs secured to the top and bottom discs and alternate ones of the discs therebetween which project out on the same side of the column are attached to a common wire 42. Wire 42 is grounded to the body 12 of the valve 11 through a path including the top and bottom copper discs and top and bottom plates 38 and 39 respectively. The body 12 is in turn grounded by means of a ground wire 45 attached thereto. The remaining alternate tabs projecting from the other side of the column are attached to an insulated wire 43 which extends exterior the valve 11 through a passage 44 in stem 21, and registering passage 46 in seal nut 24. The passage 44 is closed as by means of a step washer 47, a washer 48 and a rubber seal 49 in order to provide a vacuum tight seal between the interior and exterior of the valve 11 while simultaneously permitting the exit of wire 43 therefrom. Washer 49 may be made of a material other than rubber (e.g., Teflon) when operating temperatures are such to preclude the use of rubber, or when baking of the valve is necessary for high vacuum application. Also, the passage 46 through the seal nut 24 may be filled with a high melting point epoxy resin for similar reasons.

The bottom plate 39 has concentrically secured to its under surface a circular plug 51 which is provided with a downwardly extending preferably metal tip 52, where such tip is designed to mate in close fit with the beveled metal seal seat 17 of orifice 14 to effect a metal-to-metal high vacuum gas seal therebetween. The bottom plate 39 shoulders downwardly against an annular spring washer 53 mounted within the lower end of the body whereby the washer exerts a pressure against the plate tending to force the electrostrictive column upwardly against the convex surface 22 of stem 21. Washer 53 has holes therethrough to allow communication of gas from the port 34 to the orifice 14.

With the foregoing construction of the valve, it will be appreciated that the principal components thereof may be readily assembled and adjusted for operation by first inserting and tightening guide screw 27 in place in stem 21. The final adjustment of pressure imparted to the stacked column is then achieved by turning nut 18. As previously mentioned the difference in size of screw threads 13 and threaded bore 19 provides a very fine adjustment of the stem 21 in the axial direction as nut 18 is turned. Thus contact may be readily made between tip 52 and seal seat 17 without any force being exerted therebetween.

Regarding the operation of the valve 11 the exterior cavity 16 thereof is secured to the surface of the ion source, or other device requiring a supply of gas, by means of a flange 54 and such gasket as may be necessary to effect a high vacuum seal therebetween. A supply of gas (not shown) is connected to port 34 by some means such as a tube (not shown) and gas is forced under pressure into the enclosure 33. To prevent the passage of gas a voltage is placed across the lead zirconate column by means of high voltage wire 43 causing the discs 36 to minutely expand axially between the copper discs 37 in accordance with the theory of behavior of electrostrictive materials. Since upward movement of the column is prevented by stem 21 the expansion of the discs 36 causes the tip 52, which is already in contact with seal seat 17, to exert a force thereagainst. Such force effects in turn a tight vacuum seal allowing no gas to pass therethrough. The voltage employed is of such magntiude as is necessary to produce stresses in the metal of tip 52 and seat 17 to pass the yield point thereof, resulting thereby in an actual flow of metal and a very god high vacuum seal therebetween. At the precise moment a supply of gas is desired a conventional electronic timing circuit connected to valve 11 removes the voltage placed on wire 43 and the lead zirconate discs 36 contract to their original thickness. The stress placed upon tip 52 against seat 17 is thereby removed and the difference in pressure between enclosure 33 and cavity 16 forces gas through the touching faces of tip 52 and seat 17, through orifice 14 and into the ion source or other device upon which valve 11 is secured. The removal of the stress between tip 52 and seat 17 is partially effected by spring washer 53 which acts as an aid in returning the column to its original state. Thus it is to be noted that the tip 52 does not actually move away from seal seat 17 when the voltage is removed and the valve 11 "opens." Instead, only the stress between the tip and seat is relaxed thereby removing the metal-to-metal seal and allowing gas to be forced therebetween.

By variation of the length of the voltage pulse and the pulse repetition rate a wide range of gas demand conditions may be met. Pulse duration times may vary from a high value of 100µ seconds to a low value approaching infinite time, the latter rate corresponding to D.C. conditions. The repetition rate likewise may be varied on the order of from one to thousands of pulses per second where both the pulse duration and the repetition rates are controlled by a conventional associated electronic circuit. It has been determined that any limitations on the speed of flow control operation is, in fact, not determined by the valve which is capable of even higher speeds of operation, but by the controlling electronic circuit.

While the invention has been described herein with respect to a single preferred embodiment it will be apparent that numerous variations and modifications may be made within the spirit and scope of the invention and thus it is not intended to limit the invention except by the terms of the following claims.

What is claimed is:

1. In a valve for metering minute quantities of gas, the combination comprising a hollow body closed at one end and open at the other, said body having an outlet orifice through its closed end and an inlet port through the sidewall thereof, said outlet orifice having a beveled interior surface to define a seal seat therein, and an axially expandable electrostrictive valve assembly mounted within said body and including a beveled tip arranged to mate and be held in touching contact with said outlet orifice seal seat to effect a vacuum tight seal between said orifice and said outlet port by causing a flow of metal between said beveled tip and said beveled seal seat upon energization of said valve assembly with electrical current.

2. In a valve for metering minute quantities of gas, the combination comprising a hollow cylindrical body, means defining an enclosure within said body having an inlet port and an outlet orifice therein, said outlet orifice having a beveled interior surface to define a seal seat therein, a beveled tip disposed within said enclose to mate in touching spatial relation with said orifice seal seat, electrostrictive means for imparting pressure to said tip in excess of the yield point of the metal of same to effect a flow of metal between said tip and said orifice seal seat, said electrostrictive means including a stacked column of electrostrictive discs disposed within said body and secured at one end to said tip while having a high voltage source connected in energizing relation thereto, and stem means secured within said body against the opposite end of said stacked column from said tip to restrict expansion of the column to the direction of the tip upon energization of said column.

3. The combination according to claim 2 wherein the stacked column of electrostrictive discs comprises a first plurality of discs exhibiting an electrostrictive effect disposed in stacked columnar relationship, a second plurality of electrically conductive discs alternately interposed between said first plurality of discs with the number of the former being one more than the number of the latter, a ground wire connected to the two outer and alternate ones of the intermediate conductive discs, a high voltage wire connected to the remaining alternate conductive discs, a circular top plate coaxially secured to the upper end of said stacked column and in abutment with said stem means, a circular bottom plate coaxially secured to the lower end of said column, and a circular plug coaxially secured to said bottom plate with the free end of said plug defining said vacuum sealing tip.

4. In a valve for metering minute quantities of gas, the combination comprising a cylindrical hollow body closed at one end and open at the other, said body having an outlet orifice through its closed end and an inlet port through its sidewall, said outlet orifice having a beveled interior surface to define a seal seat therein, a valve stem coaxially disposed within the open end of said body and spaced from the closed end thereof to define an enclosure within the body adjacent the closed end thereof in communication with said orifice and said port, axially expandable electrostrictive means including a plurality of electrostrictive discs stacked in a cylindrical column and concentrically disposed within said enclosure in radially spaced relation to the sidewall of the body, said column coaxially abutting against said stem, electrical means connected in energizing relation to said discs to effect electrostrictive expansion thereof axially of the body upon energization, a plug secured to the opposite end of said column from said stem and having a beveled tip facing said orifice seal seat to vacuum seal the same upon expansion of said discs wherein such seal is effected by stressing the metal of said tip beyond its yield point to cause same to flow in relation to said orifice, and threaded adjusting means securing said stem to said body for minutely varying the axial position of the stem relative to the body whereby the stresses within said tip relative to said seal seat may be adjusted.

5. In a precisely controlled valve for metering minute quantities of gas, the combination comprising a hollow cylindrical body having an internally threaded open end and a closed end, said body having an outlet orifice through its closed end and an inlet port through its side wall, said orifice having a beveled interior surface to define a seal seat, an annular adjusting nut with an axially threaded bore and external threads matching the internal threads of the open end of said body, said bore having threads of finer thread size than said external threads of the adjusting nut, a cylindrical stem slidably fitted within the body with one end spaced from the closed end of the body to define an enclosure within the body adjacent its closed end and in communication with said orifice and said port and the other end threaded to match the bore of said adjusting nut and in engagement therewith, said stem having an axially extending passageway, seal means defining a vacuum tight seal within said passageway, an axially expansive column formed of a plurality of electrostrictive discs secured in alternate arrangement with a plurality of copper discs, one end of said column coaxially abutting against said stem and in concentric spaced relation to said body, the other end of said column having a circular plug coaxially secured thereto with a beveled tip facing said seal seat of said orifice, a ground wire connected to the two outer and alternate intermediary ones of said copper discs, and a high voltage wire extending through said passageway and seal means and connected to the remaining alternate copper discs, said wire adapted for connection to a high voltage source to apply voltages across said electrostrictive discs and thereby expand and force said tip against the beveled seal seat to stress the metal of said tip beyond its yield point to cause same to flow and provide a vacuum tight seal between said tip and said orifice.

References Cited in the file of this patent
UNITED STATES PATENTS

| | | |
|---|---|---|
| 2,721,100 | Bodine | Oct. 18, 1955 |
| 2,860,265 | Mason | Nov. 11, 1958 |
| 2,883,486 | Mason | Apr. 21, 1959 |
| 2,887,294 | Hahn | May 19, 1959 |
| 2,902,251 | Oncley | Sept. 1, 1959 |